N. E. BUNTING.
COMBINED HARVESTER AND THRESHER.
APPLICATION FILED MAY 1, 1913.

1,222,730.

Patented Apr. 17, 1917.
4 SHEETS—SHEET 4.

Witnesses:

Inventor.
Norman E. Bunting,
By
Atty.

UNITED STATES PATENT OFFICE.

NORMAN E. BUNTING, OF CHICAGO, ILLINOIS, ASSIGNOR TO INTERNATIONAL HARVESTER COMPANY OF NEW JERSEY, A CORPORATION OF NEW JERSEY.

COMBINED HARVESTER AND THRESHER.

1,222,730.  Specification of Letters Patent.  Patented Apr. 17, 1917.

Application filed May 1, 1913. Serial No. 764,849.

*To all whom it may concern:*

Be it known that I, NORMAN E. BUNTING, a citizen of the United States, residing at Chicago, in the county of Cook and State of Illinois, have invented certain new and useful Improvements in Combined Harvesters and Threshers, of which the following is a full, clear, and exact specification.

This invention relates to combined harvesters and threshers.

It has for its object to increase the efficiency of machines of this type. Further objects of this invention are to reduce the weight of the machine, increase the traction of the main wheel and reduce the draft in such a manner as to provide a comparatively light machine of compact and rugged construction which is adapted to perform economical and efficient service under varying conditions. These objects are attained by an improved combination of the several mechanisms comprising the machine and by specific improvements in the machine frame, the conveyer mechanism and the threshing and separating mechanism, as well as the means for operatively connecting, driving and adjusting these mechanisms.

In order that this invention may be clearly and fully disclosed, one embodiment thereof is shown in the accompanying drawings. It is to be understood, however, that the form chosen for purposes of illustration may be modified without departing from the spirit of the invention.

The construction shown, when broadly considered, comprises a wheeled frame, cutting apparatus disposed transversely thereof and of the line of draft, conveyer mechanism receiving the grain cut by the cutting apparatus and delivering the same in a rearward direction substantially at right angles to the cutting apparatus, threshing mechanism carried on the frame between the main wheel thereof and the side transport wheel receiving the grain from said conveyer mechanism, and separator mechanism coöperating with said thresher mechanism and located substantially beneath the rearwardly extending straw racks of the latter; the several mechanisms of the machine being of an improved construction and operatively connected, controlled and adjusted in an improved manner hereinafter described.

In order that the relation of the several parts of the mechanism in their respective locations may be more clearly understood, the frame or truck of the machine will first be described.

The machine frame.

This frame is of the wheeled type and is adapted to be drawn by horses, trailed in the rear of a tractor, or used in tandem relation with other machines.

Figure 1:
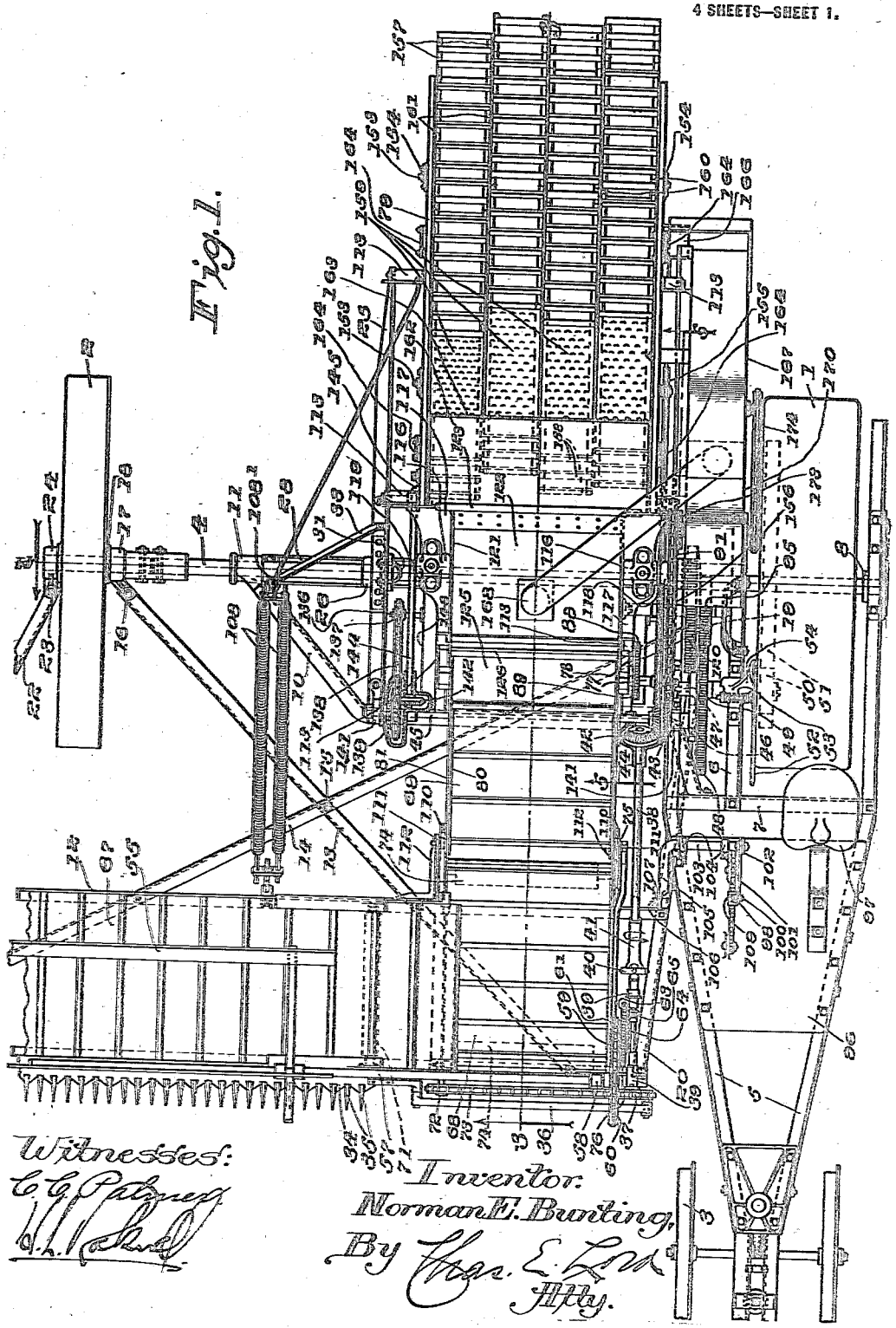
Figure 1 is a top plan view of the machine.
Figure 4:
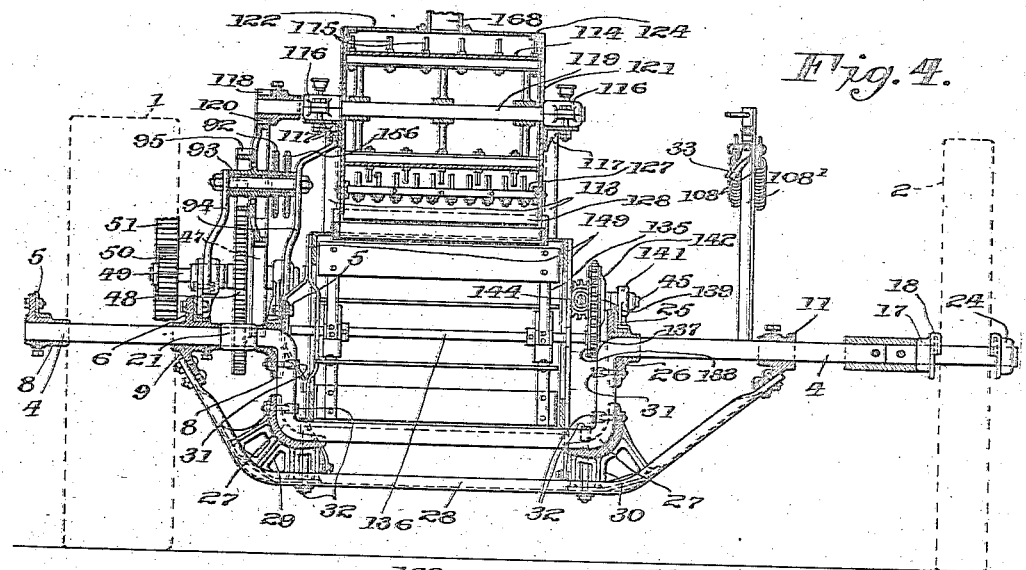
Fig. 4 is a sectional view on line 4—4 of Fig. 1.

It is mounted upon a main wheel 1, a side transport wheel 2 parallel thereto and spaced apart therefrom, and a front wheeled truck 3 disposed substantially in front of the main wheel. As shown in Fig. 1, the main wheel 1 and the transport wheel 2 are rotatably mounted upon the opposite ends of a transversely disposed axle member 4. This axle member is connected to the wheeled truck 3 by a plurality of longitudinally disposed frame members 5 converging and rigidly connected together at their front ends above the tongue truck and disposed parallel to each other at their rear ends on opposite sides of the main wheel. As shown, this latter wheel is rotatable upon the axle 4 adjacent the stubbleward frame member 5 and between the same and a short rearwardly extending frame member 6 which is rigidly attached at its front end to a short transversely disposed brace or frame member 7 rigidly connected at its opposite ends to the members 5 at points in front of the main wheel. As illustrated in Fig. 4, the axle member 4 is journaled in suitable brackets 8 and 9 fixed thereto and to the frame members 5 and 6 respectively. A second transverse frame member 10 is also provided, the ends of which are bent forward and rearward respectively at an angle and rigidly attached to the brace 7 and a bracket 11 fixed to the axle member 4 at a point adjacent the transport wheel 2.

Figure 2:
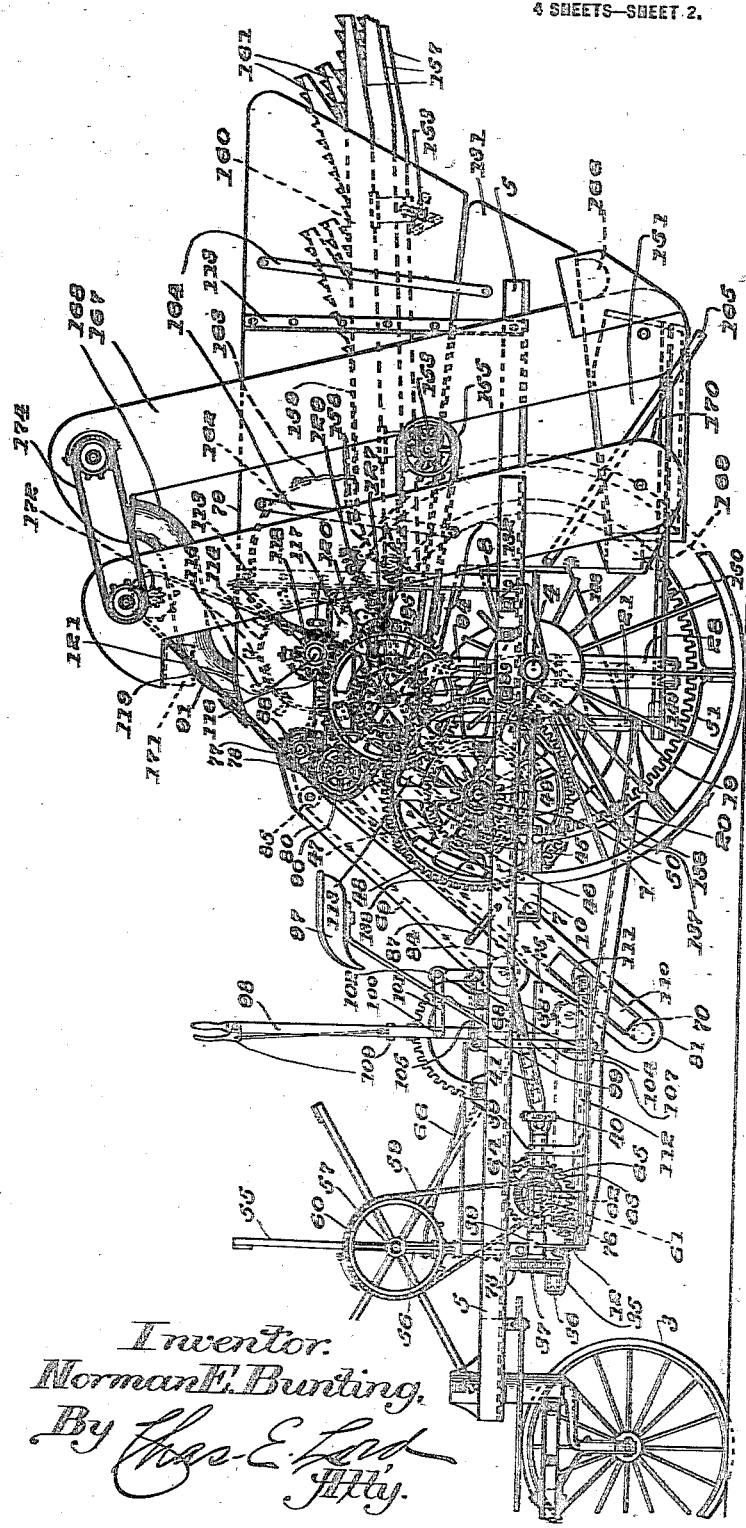
Fig. 2 is a side elevation of the same.

A supplemental frame, cutter frame or grain platform for the heading or cutting apparatus is pivoted upon the axle member 4 and disposed in front of the same at one side of the main wheel 1 and across the line of draft. As shown in Figs. 1 and 2, this frame comprises a rigid horizontally disposed conveyer frame 12 of angle material having diagonally disposed cross supports or braces 13, 14, of angle material attached to the same near its ends and bowed intermediate their ends and rigidly connected together by a bolt 15 at the point where the member 14 crosses the member 13. As shown, the front ends of these two members underlie the frame 12 and are rigidly connected thereto at a plurality of points between its ends. The rear end of the member 13 is attached at 16 to a bracket 17 rotatably mounted on the axle member 4 adjacent the stubbleward side of the transport wheel 2 and preferably provided with a flange 18 inclosing the end of the wheel hub. The rear end of the member 14, however, is rigidly attached at 19 to the rear end of a longitudinally disposed support 20 rigidly attached at its front end to the stubbleward end of the frame 12 and at its rear end attached to a depending bracket member 21 journaled upon the axle member 4 at a point between the frame member 6 and the grainward frame member 5. A fourth diagonally disposed support or brace 22 is attached at its front end to the grainward end of the frame 12 in substantially the same manner as the members 13 and 14, and is attached at 23 to a bracket 24 of similar construction to the bracket 17, rotatably mounted on the grainward end of the axle member 4 and on the opposite side of the transport wheel 2 from the bracket 17. It is to be noted that the frame thus provided to carry the cutting mechanism is movable about the axle member 4 as a pivot so that the height of its front end from the ground may be varied by the manipulation of adjusting mechanism hereinafter described. It is further to be noted that the frame, while so adjustable, is at the same time so rigidly braced and connected as to provide an exceedingly rugged and rigid construction.

The frame for the threshing and separating mechanism is likewise carried upon the axle member 4 and located between the main wheel 1 and the transport wheel 2. This frame is disposed longitudinally as shown in Fig. 1 in substantially the same plane as the frame members 5 and 6, and comprises a longitudinally disposed frame member 25 rigidly supported at its front end on the transverse frame member 10 and at a point intermediate its ends supported by a bracket 26 carried on the axle member 4. As shown, the frame member 25 and the grainward frame member 5 are protruded rearward beyond the end of the stubbleward grain member 5 substantially parallel to each other in such a manner as to form a support for the threshing and separating mechanism. In order that this mechanism may be carried close to the ground to afford a compact construction adapted to use on uneven ground, the axle member 4 is bowed intermediate its ends into substantially U shape as shown at 27, and the brackets 8 and 26 are so shaped as to conform to the curvature thereof. In order to provide a rigid support, the axle member 4 is also braced by a substantially U-shaped truss or channel 28 which extends under the bowed portion of the member 4 and is attached at its ends to the brackets 9 and 11 and itself provided with brackets 29, 30 in which are seated the lower rounded shoulders of the axle member. Further rigidity of the parts is obtained by attaching the several bracket members to the axle member by suitable flat U-bolt connections 31, 32.

Upon the frame thus formed the heading or cutting apparatus and the threshing and separating mechanisms are carried. Of these mechanisms we will first consider the heading or cutting apparatus.

*The heading or cutting apparatus.*

This apparatus is carried upon the frame 12 and disposed transversely to the line of draft in such a manner that it cuts the grain as the machine is drawn forward.

It comprises a knife bar 34 reciprocable across the front edge of the frame between the guard fingers 35 carried thereon. This knife is operatively connected through a pitman connection 36 with a sprocket 37 carried on the end of a power shaft 38 driven from the main wheel. As shown in Fig. 1, this shaft is journaled in suitable bearings 39 carried upon the stubbleward end of the frame 12 and is disposed parallel to the line of draft; the front end of the same being disposed parallel to the ground and connected through a universal joint 40 and an extensible connection 41 with an upwardly extending portion thereof. As shown in Fig. 1, this shaft is operatively connected through beveled gears 42, 43, carried in a gear casing 44 journaled in the frame, to a transversely disposed shaft 45 which is in turn driven by a pinion 46 meshing with an internal gear 47 on a larger gear 48 likewise journaled on the frame and carried upon a stub shaft 49 at the rear of the shaft 45 and parallel thereto. Upon the stubbleward end of this stub shaft 49 is carried a similar pinion 50 which meshes with an internal gear 51 upon the main wheel 1 and upon manipulation of a controlling lever 52, normally held under pressure by means of a spring 53 and pivotally mounted upon a bracket 54 carried upon the frame, is movable into or out of locking relation with its shaft 49. Obviously, when it is desired to throw the cutting mechanism into or out of gear, this may be readily accomplished by adjusting the operating lever or controlling member 52 to the desired position.

Coöperating with the knife bar 34 is a reel 55. This reel is journaled in supports 56 carried on the front end of the frame 12 and is so disposed with respect to the cutting mechanism that it operates upon the grain in the usual manner. This reel is carried upon a suitable shaft 57 mounted in a well known manner in bearings 58, only one of which is shown, and is also operatively connected to the main wheel through the power shaft 38. This connection is shown in Figs. 1 and 2 to comprise a sprocket and chain connection 59 extending between a sprocket 60 on the stubbleward end of the reel shaft 57 and a small sprocket 61 carried upon a stub shaft 62 journaled in the frame 12 at a point intermediate the ends of the horizontal portion of the power shaft 38 and disposed at right angles thereto. As shown in these figures, this shaft 62 also carries a pinion 63 adjacent the sprocket 61, and this pinion is provided with a beveled gear 64 on its outer face which meshes with a corresponding gear 65 carried on the shaft 38. It is thus seen that as the shaft 38 is rotated, the rotation of the same is transmitted to the reel through the beveled gear connection 64, 65 and the sprocket and chain connection 59, 60, 61. As in the case of the cutting mechanism, the reel is also controlled by the lever 52. Obviously, if desired, in order to suitably brace the reel support, a suitable longitudinally disposed stay or stays 66 may be provided between the reel supports and the rear of the frame 12.

Coöperating with the cutting mechanism is a conveyer mechanism which, as it is cut, feeds the grain transversely and then rearwardly.

*The conveyer mechanism.*

This conveyer mechanism comprises a plurality of conveyers 67, 68, 69 and 70.

The conveyer 67 is carried on suitable rollers 71 journaled in the frame 12 and is disposed horizontally along the frame to a point adjacent the end of the pitman connection 36 where the front end of the same is raised and the roller shaft is provided with an extension carrying a sprocket 72 driven by a chain 73 from the sprocket 37 on the end of the power shaft 38.

The conveyer 68 is disposed at right angles to the conveyer 67 and beneath the stubbleward end thereof, and is shorter than the latter. As shown in Fig. 1, it is carried on rollers 74 journaled in the frame 12 and spaced extensions 75 protruding rearward from the stubbleward end thereof. This apron is likewise driven from the power shaft 38, a pinion 76 being provided on the stubbleward end of the front roller shaft which meshes with the teeth of the pinion 63 and is driven by the latter in such a manner that when the shaft 38 is rotated the conveyer 68 moves toward the rear, feeding the grain delivered to it by the conveyer 67 in a rearward direction.

Coöperating with the conveyer 68 are the superimposed thresher feeding conveyers 69 and 70. As shown in Fig. 2, these two conveyers are pivotally mounted upon shafts 77 and 78 journaled in the thresher frame 79 at points above the conveyer 68 and at the rear thereof; the two conveyers being carried in frames 80 and 81 which protrude downward from their pivots on the shafts 77, 78 into such a relation with the conveyer 68 that the grain fed rearward thereby is fed upward by the two conveyers 69 and 70. As shown, the conveyer 70 is mounted upon suitable rollers 82, 83 of different diameters journaled in the frame 81 and this conveyer is longer than the conveyer 69, protruding beneath the rear end of the conveyer 68. The shorter conveyer 69 is mounted upon rollers 84, 85 and 86 and extends part way down the conveyer 70, into contact therewith at a point adjacent the upper end of the latter, and beyond this end, the roller 85 of the conveyer 69 being smaller than the other rollers and acting as an idler, while the roller 86 thereof is located substantially in rear of the roller 85 so that the delivery end of the upper conveyer is angularly disposed with respect to the lower conveyer and brought into closer proximity to the thresher. As shown, the two conveyer frames 80 and 81 are also connected by links 87 which hold the lower end of the conveyer 69 away from the surface of the conveyer 70, thereby causing that end to be angularly disposed with respect to that conveyer, yet permitting the conveyer 69 to rise and fall independently of the conveyer 70. Both of these conveyers are preferably driven at the same speed through intermeshing pinions 88, 89 carried on the stubbleward ends of the shafts 77, 78 respectively and driven through a sprocket 90 (on the end of the shaft 78) and a chain 91. This chain 91 is driven by a sprocket 92 carried upon a stub shaft 93 journaled in the frame on brackets 94 and this sprocket 92 is driven through a pinion 95 fixed to the shaft 93 and meshing with the gear 48 heretofore described.

The supplemental frame 12 carrying the cutting apparatus, the reel and the conveyers 67, 68, is, as heretofore described, movable about the axle member 4 as a pivot through improved adjusting mechanism.

*The cutter frame adjusting mechanism.*

This mechanism is operated from a horizontally disposed platform 96 carried on the frame members 5 at a point in front of the main wheel and adjacent the operator's seat 97.

It comprises a vertically extending lever 98 pivoted to the frame at 99 and connected at 100 to a rearwardly extending link 101. This link is pivoted at its rear end to an upstanding arm 102 on a transversely disposed member 103 journaled in suitable bearings 104 on the platform 96 and provided with a forwardly protruding arm 105 substantially at right angles to the portions 102, 103 and pivotally connected at 106 to a depending member 107 pivoted to the bottom of the frame 12 at a point adjacent the stubbleward end of the same. It is to be noted that by the movement of the lever 98, the arm 102 is thrown about in its bearings 104 in such a manner as to raise or lower the arm 105 and transmit this movement to the member 107 to move the whole frame 12 and the mechanism carried thereby about a pivot on the axle member 4. It is further to be noted that due to the lever connection employed, the amount of effort required to lift the arm and its mechanism is materially reduced, and that a pair of springs 108 interposed between the frame 12 and a bracket 108' at the grainward end of the truss 28, (the latter braced on the frame member 25 by a brace 33), assist the operator in the raising operation. Obviously, in order to hold the frame in any desired position, a suitable segment and coöperating detent mechanism 109 may be provided.

Coöperating with this adjusting mechanism and serving to maintain the conveyers 69 and 70 in the desired relation to each other in any position of the frame 12, is an improved sliding connection between the rear end of the frame 12 and the conveyer frame 81. This connection comprises a plurality of elongated ways 110 disposed longitudinally of the frame 81 and attached thereto near its lower ends and on its opposite sides, in which the rollers 111 journaled on the ends of rearward extensions 112 on the frame 12, are movable when the latter is adjusted. It is to be noted in this connection that when the frame 12 is moved upward or downward, the same is thus automatically maintained in the desired relation to the conveyer frame 81 so that the grain fed out from the conveyer 68 is received by the conveyer 70; the rollers 111 moving longitudinally in the ways 110, as is clearly apparent from Fig. 2.

Due to the construction and arrangement of the conveyers 69 and 70, the grain is compressed and fed out evenly between the upper ends of these conveyers in a rearward direction directly to the cylinder of the threshing mechanism.

*The threshing mechanism.*

This mechanism is carried by the thresher box 79, which is in turn supported upon vertically extending standards 113 rigidly attached to the frame members 5, 10 and 25 between the main wheel 1 and the side transport wheel 2.

Figure 3:
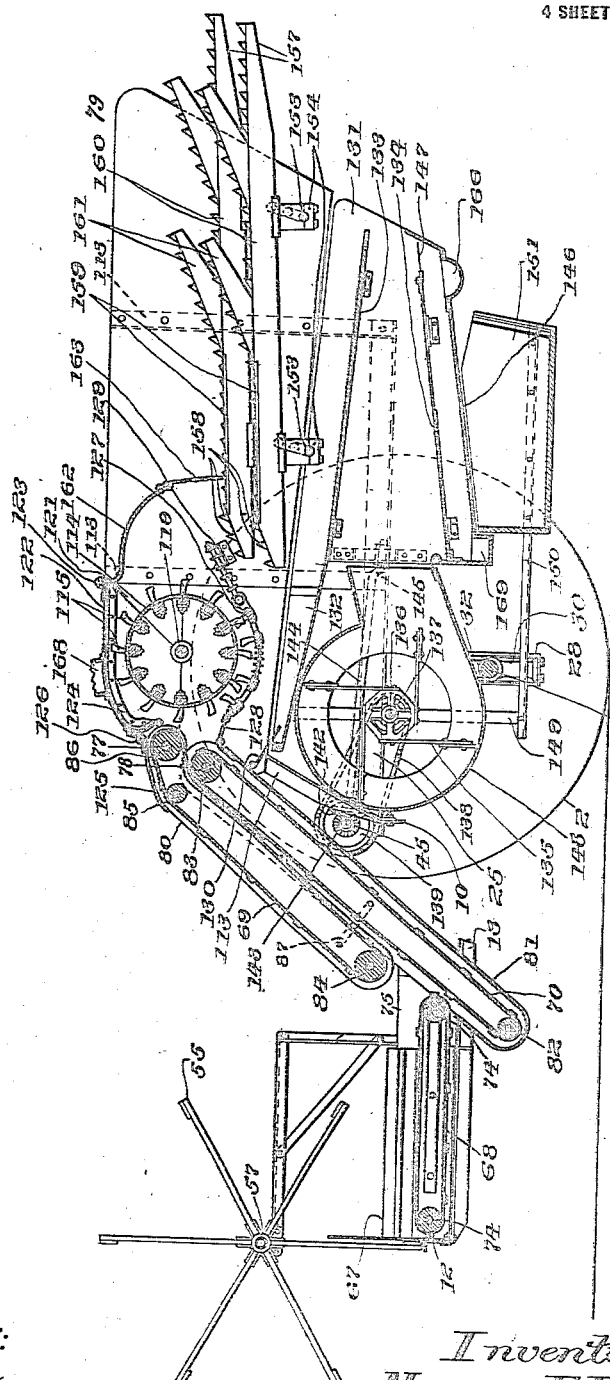
Fig. 3 is a sectional view taken on line 3—3 of Fig. 1.

The cylinder 114 thereof is provided with the usual teeth 115 on its periphery, and, as shown in Fig. 2, is journaled in suitable bearings 116 carried on longitudinally disposed brackets 117 on the outside of the thresher box and driven through a pinion 118 journaled on the end of its shaft 119 and meshing with the gear 120 carried on the shaft 93 and driven from the main wheel. As shown in Fig. 3, this cylinder is inclosed by a metallic casing 121 having a removable cover 122 which is pivoted at 123 to the thresher frame 79 and provided with a flange 124 which extends to a point adjacent the surface of the apron 69. Coöperating with this lid 122 is a pivoted flap 125 carried on a transverse rod 126 journaled to the front end of the casing 121. As shown, the casing 121 extends down vertically on the opposite ends of the cylinder and carries a thresher concave 127 which coöperates with the cylinder in a well known manner, a flap 128 connecting the front end of this concave with the bottom of the frame 81, and a grate 129 being attached to the rear end thereof.

The separator mechanism is disposed beneath this concave. As shown, a slanting deflector 130 is attached to the casing and beneath this deflector is pivotally mounted a grain pan 131 having a slanting bed 132 protruding under the deflector 130 and screens 133, 134 spaced apart from the bottom thereof in such a manner as to separate the grain from the chaff as the same falls down upon the grain pan from the thresher cylinder. As in the usual construction, a fan 135 is provided. This fan is carried on a shaft 136 journaled beneath the thresher cylinder and the grain pan 131, and is driven through a sprocket 137 on the grainward end of this shaft and a chain 138. This chain 138 is driven through a sprocket 139 carried on the shaft 45 which is mounted in bearings 141 on the frame member 10 and driven by the main wheel through gearing heretofore described. The grain pan 131 is likewise driven from this shaft 45 through a beveled gear 142 meshing with teeth 143 upon the side of the sprocket 139 and carried upon the end of a longitudinally and downwardly disposed shaft 144 having a crank 145 on its rear end which, when the shaft is rotated, imparts a rocking movement in a lateral direction to the frame 131. As in the usual construction, the end of the grain pan 131 is open so that the draft from the fan 135 may blow out the chaff and dirt from the rear of the same as the grain passes between the screens. As in the usual construction, a weed screen 146 may be provided beneath the screen 134 and a suitable retarder 147 may be provided at the end of the same. Further, as in the usual construction, the fan is inclosed in a suitable casing 148 which, in this construction, is shown to be supported by braces 149 supported by the truss member 28 through horizontally disposed supports 150. These supports 150 may also be used to support a wood seed box 151 at a point beneath the weed screen 146.

The straw rack mechanism is disposed adjacent the end of the grate 129 and above the grain pan 131, and is mounted in the box 79. This mechanism comprises a plurality of straw racks which are operatively connected through multiple throw crank shafts 153 journaled at their ends in the box 79 and on the straw rack frame in bearings 154 and driven through a sprocket and chain connection 155 from a sprocket 156 on the shaft 93. Each of these straw racks preferably comprises a pair of parallel members 157 having a plurality of parallel slats 158 disposed transversely thereof on an inclined portion of the same substantially beneath the grate 129. As the straw is fed out from this grate 129, it is kicked upward by the slats and deposited upon a screen 159 having a plurality of perforations therein. From this screen it is then fed rearwardly to a series of slatted portions 160, 161 alternately disposed horizontally and at an angle to the horizontal and so arranged as to kick the straw upward and fluff the same out thoroughly before the same is ejected through the open end of the box 79. Obviously, due to the provision of the multiple crank, the several racks will be given an orbital movement and will act successively upon the straw in such a manner as to fluff out the same and thoroughly separate the threshed grain therefrom so that the latter will fall through the same upon the grain pan 132. In order to prevent the cylinder from discharging the straw in an upward direction, a curved shield 162 is provided at the rear of the same which extends down in the path of the straw discharged from the cylinder and deflects the same upon the straw racks, a flexible flap 163 preferably being provided upon the lower end of the same in order to lie close upon the straw and yet enable the latter to be fed outward by the straw racks. As shown in Fig. 2, suitable rods 164 may connect the box 79 and the grain pan box 131 and in order to further suitably support the parts, the weed seed box 151 may be attached to the grain pan box 131 by suitable braces 165.

Figure 5:
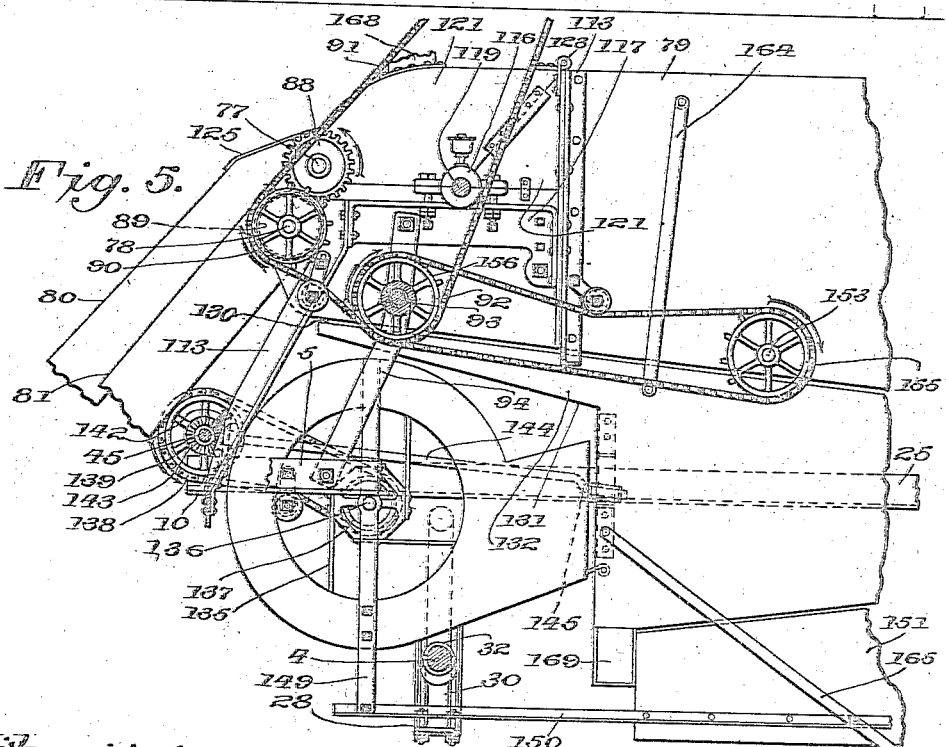
Fig. 5 is a sectional view on line 5—5 of Fig. 1.

As the unthreshed grain is separated from the chaff and the clean grain, it is received in a transversely disposed slanting trough 166 (at the rear end of the box 131 and substantially beneath the retarder 147) and by it is conducted to an elevator 167 which extends upward parallel to the thresher box 79 to a point above the cylinder 114, where it is connected through a pipe 168 with the cylinder chamber in such a manner as to return the tailings to the cylinder to be again acted upon by the threshing mechanism. The threshed grain, on the other hand, is conducted from the front end of the box 131 by a transversely disposed slanting trough 169 and delivered to the elevator 170 which extends substantially parallel to the elevator 167 and may be provided with any suitable chute connection 171 adapted to use in bagging the grain, or conveying the same to any suitable grain box carried upon the frame in a well known manner. As shown in Figs. 2 and 5, the conveying mechanism for each of these elevators 167, 170 is driven from the chain 91 which rotates a pinion 172, journaled at the top of the conveyer 170, and through it and a pinion 173, drives a chain and sprocket connection 174 operatively connected to the elevator mechanism of the elevator 167.

The operation of the construction shown is as follows: Let us assume that the machine is being drawn toward the grain. In order to set the several mechanisms of the machine in motion, the operator throws the lever 52 about its pivot to throw in the pinion 50. Through the gearing heretofore described, each of the mechanisms in the machine is then positively connected to the main wheel. The knife bar is being operated; the conveyers are moving; the reel is rotating; the thresher cylinder is rotating; the straw racks are moving through their orbital movement; the grain pan is being moved back and forth in a lateral direction; the fan is rotating; and the grain and tailings elevators are operating, so that as the grain is cut it is threshed and separated, the clean grain being delivered at one point, while the straw and chaff are ejected at the rear parallel to the line of draft. Obviously, if the operator desires to adjust the height of the cutting mechanism, this adjustment is readily accomplished by manipulation of the lever 98.

It is to be noted that in this construction the entire mechanism is controlled by a pair of levers readily operable from the operator's seat. It is further to be noted that the construction is exceedingly rugged and that the weight of the same is so disposed with respect to the main wheel that the traction of the main wheel is high and the draft is reduced. Attention is further directed to the fact that due to the location of the front wheeled truck at one side of the main wheel, side draft is materially reduced. The construction is further so compact that it may be readily maneuvered as desired in the field. These and numerous other advantages will be apparent to those skilled in the art.

While one embodiment of this invention has been described herein, it is to be understood that the form chosen for purposes of illustration is susceptible of modification without departing from the spirit of this invention.

What is claimed as the invention and desired to secure by Letters Patent is:—

1. In a combined harvester and thresher, a frame, a thresher thereon, a vertically adjustable grain platform pivoted to said frame, a conveyer thereon, a coöperating thresher feeding conveyer on said frame disposed at the delivery end of said platform conveyer, and operative connections between said platform and feeding conveyers whereby the former may move bodily longitudinally of the latter.

2. In a combined harvester and thresher, a frame, a thresher thereon, a vertically adjustable grain platform pivoted to said frame, a conveyer thereon, a coöperating thresher feeding conveyer on said frame disposed in rear of said platform conveyer, and sliding operative connections between said platform and feeding conveyer whereby the former may move bodily longitudinally of said feeding conveyer.

3. In a combined harvester and thresher, a frame, a thresher thereon, a vertically adjustable grain platform pivotally connected to said frame, a conveyer thereon, a coöperating thresher feeding conveyer carried by said frame disposed in rear of said platform conveyer, and operative connections between said platform and feeding conveyer and said feeding conveyer and frame whereby said platform may move bodily longitudinally of said feeding conveyer and the latter may rise and fall.

4. In a combined harvester and thresher, a frame, a thresher thereon, a vertically adjustable grain platform pivotally connected to said frame, a conveyer on said platform, a coöperating thresher feeding conveyer pivoted on said frame at its rear end and disposed in rear and beneath said platform conveyer, and operative connections between said platform and feeding conveyer whereby the former may move bodily longitudinally of the latter.

5. In a combined harvester and thresher, a frame, a thresher thereon, a vertically adjustable grain platform pivotally connected to said frame, a conveyer on said platform, a coöperating thresher feeding conveyer pivoted on said frame at its rear end and disposed in rear and beneath said platform conveyer, and guide and roller connections between said platform and feeding conveyer whereby the former may move bodily longitudinally of the latter.

6. In a combined harvester and thresher, a frame, a thresher thereon, a vertically adjustable grain platform pivotally connected to said frame, a rearwardly movable conveyer on said platform, a coöperating thresher feeding conveyer disposed in rear of said platform conveyer and pivotally connected to said frame, and automatically adjustable sliding connections between said platform and said feeding conveyer whereby the former may move bodily longitudinally of the latter.

7. In a combined harvester and thresher, a frame, a thresher thereon, a vertically adjustable grain platform pivotally connected to said frame, transversely and rearwardly movable coöperating conveyers on said platform, a coöperating thresher feeding conveyer disposed in rear of said platform and pivotally connected to said frame, and automatically adjustable sliding connections between said platform and said feeding conveyer whereby the former may move bodily longitudinally of the latter.

8. In a combined harvester and thresher, a frame, a thresher thereon, a vertically adjustable grain platform pivotally connected to said frame, a conveyer on said platform, a coöperating thresher feeding conveyer slidably connected with said platform adjacent the end of said platform conveyer and pivotally connected to said frame at a point adjacent said thresher, and a coöperating thresher feeding conveyer superimposed upon said feeding conveyer and adjustable therewith.

9. In a combined harvester and thresher, a frame, a thresher thereon, a vertically adjustable grain platform pivotally connected to said frame, a conveyer on said platform, a coöperating thresher feeding conveyer slidably connected with said platform adjacent the end of said platform conveyer and pivotally connected to said frame at a point adjacent said thresher, and a coöperating superimposed thresher feeding conveyer operatively connected to said frame and vertically movable independently of its fellow.

10. In a combined harvester and thresher, a frame, a thresher thereon, a vertically adjustable grain platform pivotally connected to said frame, a conveyer on said platform, coöperating superimposed thresher feeding conveyers pivoted on said frame, one of the same being disposed at one end of said platform conveyer, and sliding connections between said platform and said last mentioned feeding conveyer whereby the former may move bodily longitudinally of the latter.

11. In a combined harvester and thresher, a frame, thresher mechanism thereon, a grain platform pivotally connected to said frame, grain conveying mechanism on said platform, a plurality of superimposed conveyers pivotally connected to said frame at a point adjacent said thresher mechanism, and a sliding connection between the lower of said conveyers and said grain platform, the upper of said conveyers extending to a point adjacent one of the limits of travel of said sliding connection.

12. In a combined harvester and thresher, a frame, a thresher cylinder carried thereon, a grain platform pivotally connected to said frame, grain conveying mechanism on said platform, a plurality of superimposed conveyers pivotally connected to said main frame at a point adjacent said thresher cylinder, and slidable connections between the lower conveyer and said grain platform, the upper of said conveyers having one end extending to a point adjacent one of the limits of travel of said sliding connection and its opposite end extending beyond the end of said lower conveyer into relatively closer proximity to said thresher cylinder.

13. In a combined harvester and thresher, a frame, an adjustable platform thereon, a conveyer on said platform, thresher mechanism on said frame, a thresher feeding conveyer operatively connected to said frame, and receiving grain from said platform conveyer, a coöperating thresher feeding conveyer overlying said conveyer, and means whereby said overlying conveyer may rise and fall independently of its fellow.

14. In a combined harvester and thresher, a frame, an adjustable platform thereon, a conveyer on said platform, thresher mechanism on said frame, a thresher feeding conveyer operatively connected to said frame, and receiving grain from said platform conveyer, and a coöperating thresher feeding conveyer overlying said conveyer, said overlying conveyer extending at an angle beyond the feeding end of its fellow into relatively closer proximity to said thresher.

15. In a combined harvester and thresher, a frame, an adjustable platform thereon, a conveyer on said platform, a thresher on said frame, a thresher feeding conveyer operatively connected to said frame, and receiving grain from said platform conveyer, a coöperating thresher feeding conveyer overlying said first mentioned conveyer and contacting therewith throughout a portion of its length, and means for moving said conveyers at substantially the same speed and in the same direction.

16. In a combined harvester and thresher, a frame, an adjustable platform thereon, a conveyer on said platform, a thresher on said frame, a thresher feeding conveyer operatively connected to said frame, receiving grain from said platform conveyer, and a coöperating thresher feeding conveyer overlying said first mentioned conveyer and contacting therewith at a point intermediate its ends, the receiving and delivery ends of said overlying conveyer being disposed angularly with respect to said first mentioned conveyer.

17. In a combined harvester and thresher, a frame, an adjustable platform thereon, a conveyer on said platform, a thresher on said frame, a thresher feeding conveyer on said frame receiving grain from said platform conveyer, and a coöperating thresher feeding conveyer overlying said first mentioned conveyer, the receiving and delivery ends of said overlying conveyer being disposed angularly with respect to said first mentioned conveyer, and the delivery end of the former extending beyond the end of the latter into proximity to said thresher.

18. In a combined harvester and thresher, a frame, thresher mechanism carried thereon, a supplemental frame pivoted thereto, grain cutting and conveying mechanism carried on said supplemental frame, means for moving said frame about its pivot, a member protruding from the rear of said supplemental frame, a conveyer receiving grain from said grain cutting and conveying mechanism and delivering the same to said thresher mechanism, said conveyer being pivoted to said main frame at a point above said supplemental frame, a roller carried on the end of said protruding member, and a guide carried on the end of said conveyer in which said roller is freely movable.

19. In a combined harvester and thresher, a frame, thresher mechanism carried thereon, a supplemental frame, a plurality of parallel rearwardly protruding members rigidly attached at their front ends to said supplemental frame and pivoted at their rear ends to said main frame, grain cutting and conveying mechanism carried on said supplemental frame, means for adjusting said supplemental frame, a plurality of members protruding from the rear end thereof, rollers carried on the ends of said members, a conveyer frame pivoted to said main frame above said supplemental frame, conveyers therein receiving grain from said cutting and conveying mechanism and delivering the same to said threshing mechanism, and a plurality of guides carried on the opposite sides of said conveyer frame in which said rollers are freely movable upon movement of said supplemental frame.

20. In a combined harvester and thresher, a frame, an adjustable cutter frame thereon, conveyer mechanism carried on said adjustable frame, a thresher cylinder carried on said main frame above said conveyer mechanism, a plurality of superimposed conveyers receiving grain from said conveyer mechanism and delivering the same to said thresher cylinder, said conveyers being pivoted to said main frame at a point adjacent said cylinder and one of the same protruding downward beneath the conveyer on said cutter frame, and means for automatically maintaining said conveyers in a predetermined relation with the conveyer mechanism on the cutter frame in all positions of the latter.

21. In a combined harvester and thresher, a main frame, an adjustable cutter frame thereon, conveyer mechanism on said cutter frame, thresher mechanism carried on said main frame, a plurality of superimposed thresher feeding conveyers receiving grain from said conveyer mechanism and pivoted to said main frame at a point adjacent said thresher mechanism, operative connections between said conveyers whereby one of the same is maintained in a predetermined relation with the other in all positions of the same, and means for automatically maintaining the lower of said conveyers in a predetermined relation with the conveyer mechanism on the cutter frame in all positions of the latter.

22. In a combined harvester and thresher, a frame, thresher mechanism thereon, an adjustable cutter frame pivoted on said frame, conveyer mechanism on said cutter frame, a thresher feeding conveyer pivoted to said frame adjacent said thresher mechanism and receiving grain from said first mentioned conveyer, operative connections between said cutter frame and thresher feeding conveyer whereby said frame may move bodily lengthwise of said conveyer, straw rack mechanism receiving the straw from said thresher mechanism, and grain separating mechanism receiving the grain from said threshing mechanism and disposed beneath said straw rack mechanism.

23. In a combined harvester and thresher, a frame, thresher mechanism thereon, an adjustable cutter frame pivoted on said frame, conveyer mechanism on said cutter frame, a thresher feeding conveyer pivoted to said frame adjacent said thresher mechanism and receiving grain from said first mentioned conveyer, operative connections between said cutter frame and thresher feeding conveyer whereby said frame may move bodily lengthwise of said feeding conveyer, straw rack mechanism receiving the straw from said thresher mechanism, grain separating mechanism receiving the grain from said thresher mechanism and disposed beneath said straw rack mechanism, and means for returning the unthreshed heads from said separating mechanism to said thresher mechanism.

24. In a combined harvester and thresher, a horizontally disposed frame, grain harvesting and conveying mechanism carried thereon, an axle member disposed transversely of said frame having a depression between its ends, a fan carried by said frame in said depression, a threshing cylinder carried on said frame above said fan, conveyer mechanism receiving grain from said cutting and conveying mechanism and delivering the same to said cylinder, straw racks carried by said frame receiving grain from said cylinder and protruding substantially at right angles to said axle member substantially in the plane of said cylinder, and grain screening mechanism disposed beneath said straw racks at the rear of said fan.

25. In a combined harvester and thresher, a frame, an axle member disposed transversely thereof, wheels carried on the opposite ends of said axle member, a plurality of supports pivoted to said axle member and protruding forward therefrom parallel to the line of draft, a transversely disposed cutter frame carried on the ends of said members, and diagonally disposed braces rigidly connected to said frame, one of said braces being pivoted at its rear end upon said axle member.

26. In a combined harvester and thresher, a frame, an axle member disposed transversely thereof, wheels carried on the opposite ends of said axle members, a plurality of supports pivoted to said axle member and protruding forward therefrom parallel to the line of draft, a transversely disposed cutter frame carried on the ends of said members, and a plurality of crossing braces rigidly connected together intermediate their ends and connected at their forward ends to said cutter frame and at their rear ends to said axle member.

27. In a combined harvester and thresher, a frame, a main wheel journaled therein, a thresher and separator carried on said frame substantially parallel to said main wheel, a cutter frame pivoted to said main frame on opposite sides of said thresher mechanism, cutting and conveyer mechanisms carried on said cutter frame, and a flexible extensible power shaft operatively connected between said main wheel and the mechanisms on said cutter frame.

28. In a combined harvester and thresher, a frame, a main wheel journaled therein, a flexible power shaft disposed parallel to the line of draft and operatively connected to said main wheel, a supplemental frame pivoted to said main frame and adjustable with respect thereto, conveyer mechanism disposed transversely of said supplemental frame, a reel carried on said supplemental frame above said conveyer mechanism, a reciprocating knife carried on said supplemental frame, a second conveyer mechanism disposed at right angles to said first mentioned conveyer mechanism, and means operatively connecting all of said mechanisms carried on said supplemental frame to the front end of said power shaft.

29. In a combined harvester and thresher, a frame, an axle member disposed transversely thereof, main and grain wheels on opposite ends of said axle member, threshing mechanism carried on said frame between said main and grain wheels, a vertically adjustable grain platform operatively connected to said frame, grain harvesting and conveying mechanism carried on said platform, an internal gear carried on said main wheel, a pinion journaled on said frame meshing with said gear, and power connections located between said threshing mechanism and said main wheel operatively connected to said threshing mechanism and said grain harvesting and conveying mechanism and driven from said pinion.

30. In a combined harvester and thresher, a longitudinally disposed frame, an axle member disposed transversely across the rear thereof, a main wheel journaled on one end of said axle member, a transport wheel carried on the opposite end thereof, a wheeled truck carried at the front end of said frame, a supplemental frame supported on said main frame and said axle member between said main wheel and said transport wheel, threshing and separating mechanism carried on said supplemental frame, power connections between the same and said main wheel, a second supplemental frame adjustable with respect to said main wheel and disposed transversely across the front of the machine at one side of said main wheel, cutting and conveying mechanism carried on said supplemental frame, power connections between the same and said main wheel, and conveyer mechanisms connecting the conveyer mechanism on the cutter frame to the threshing and separating mechanism.

31. In a combined harvester and thresher, a horizontally disposed main frame, a main wheel journaled between the rear ends thereof, a transport wheel journaled beneath the front end thereof, an axle member extending transversely of said frame and operatively connected to said main wheel, a transport wheel journaled on the opposite end of said axle member from said main wheel, longitudinally disposed thresher and separator mechanisms mounted one above the other and carried on said axle member at one side of said main frame and substantially parallel to said main wheel, a supplemental frame adjustable with respect to said main frame and said separator and thresher mechanisms, said frame being disposed transversely across the line of draft in front of said side transport wheel and said thresher and separator mechanisms, cutting and conveying mechanism carried on said supplemental frame, power connections between said main wheel and said threshing, separating, cutting and conveying mechanisms, coöperating conveying mechanism connecting the conveying mechanism on said supplemental frame to said threshing mechanism, and means carried on said main frame for adjusting said supplemental frame.

In testimony whereof I affix my signature in the presence of two witnesses.

NORMAN E. BUNTING.

Witnesses:
 WILLIAM CLARK,
 FERDINAND HACKER.